United States Patent
Uchiyama et al.

(10) Patent No.: US 6,816,673 B2
(45) Date of Patent: Nov. 9, 2004

(54) LENS-FITTED PHOTO FILM UNIT WITH OPTICAL ADAPTER

(75) Inventors: Keiji Uchiyama, Minami-Ashigara (JP); Takeshi Masuda, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/650,689

(22) Filed: Aug. 29, 2003

(65) Prior Publication Data

US 2004/0042773 A1 Mar. 4, 2004

(30) Foreign Application Priority Data

| Aug. 30, 2002 | (JP) | ......................... 2002-254648 |
| Aug. 30, 2002 | (JP) | ......................... 2002-254683 |
| Aug. 30, 2002 | (JP) | ......................... 2002-254944 |
| Nov. 18, 2002 | (JP) | ......................... 2002-334165 |

(51) Int. Cl.[7] .............................................. G03B 17/02
(52) U.S. Cl. ............................. 396/6; 396/71; 396/73; 396/530; 396/544
(58) Field of Search .............................. 396/6, 71, 73, 396/529, 530, 544

(56) References Cited

U.S. PATENT DOCUMENTS 4,961,085 A * 10/1990 Cho et al. ...................... 396/6
6,339,680 B1 * 1/2002 Mauvais ........................ 396/6
6,483,991 B2   11/2002 Uchiyama et al.

FOREIGN PATENT DOCUMENTS

| JP | A 7-92552 | 4/1995 |
| JP | A 8-15763 | 1/1996 |
| JP | A 10-307324 | 11/1998 |
| JP | A 11-38480 | 2/1999 |
| JP | A 11-352546 | 12/1999 |
| JP | A 2000-122233 | 4/2000 |
| JP | A 2000-162690 | 6/2000 |
| JP | A 2002-90948 | 3/2002 |

* cited by examiner

*Primary Examiner*—David M. Gray
(74) *Attorney, Agent, or Firm*—Young & Thompson

(57) ABSTRACT

A lens-fitted photo film unit includes a main body pre-loaded with photo film. A taking lens is incorporated in the main body. A front cover covers a front of the main body, has a lens opening where the taking lens is disposed. An optical adapter is secured to the front cover and used for a specific photographing mode. The optical adapter includes a cylindrical lens for passing object light to become incident on the taking lens. A rotatable lens holder connects the cylindrical lens with the front cover. The lens holder is shiftable between a standard position and a specific position, and when in the standard position, offsets the cylindrical lens from the taking lens, and when in the specific position, sets the cylindrical lens in front of the taking lens.

17 Claims, 18 Drawing Sheets

LENS-FITTED PHOTO FILM UNIT WITH OPTICAL ADAPTER

BACKGROUND OF THE INVENTION

1. Field of the Invention

The present invention relates to a lens-fitted photo film unit with an optical adapter. More particularly, the present invention relates to a lens-fitted photo film unit with which an optical adapter is externally combined for the purpose of an exposure in a specific photographing mode.

2. Description Related to the Prior Art

A lens-fitted photo film unit is well-known as a single-use camera of a simple structure. JP-A 7-092552 and 2000-122233 disclose the lens-fitted photo film unit of a type capable of an exposure in a specific photographing mode of various types in which a standard photographing mode is modified. Examples of the specific photographing modes include the soft focus photography, the snow cross photography with a snow cross filter, and the slim photography in which a lateral size of an object is reduced or compressed, or a vertical size of the object is extended.

JP-A 10-307324 discloses the lens-fitted photo film unit in which an optical adapter includes a lens element, filter element or other optical element for the specific photographing mode, and secured to a front cover of a housing by use of a specialized connection belt. JP-A 2000-162690 discloses the lens-fitted photo film unit in which the optical adapter in a crank shape is combined, and includes a disk-shaped plate having plural optical systems for the purpose of the specific photographing mode. Furthermore, there are documents JP-A 8-015763, 11-038480, 11-352546 and 2002-090948 disclosing an optical adapter.

However, JP-A 10-307324 requires the use of connection belts for combining the optical adapter with the housing. This raises the manufacturing cost of relevant parts, and enlarges the size of the products. JP-A 2000-162690 discloses the optical adapter of which the vertical size is larger than that of the housing. So a size of the products will be enlarged inevitably.

JP-A 10-307324 and 2000-162690 do not disclose positioning of the optical adapter in a vertical or horizontal direction. It is likely that the quality of an image at the time of the specific photographing mode will be low due to the offsetting of the optical adapter. The optical adapter is pressed on the outside of a belt-shaped outer sheet covering the front cover. In relation to the optical axis direction of the taking lens, there is no correct positioning because of flexing of the belt-shaped outer sheet.

Furthermore, there is no suggestion in JP-A 7-092552, 2000-122233, 10-307324 and 2000-162690 of treating or compensating for a remarkable difference between the field of view in the viewfinder for framing the object and a region of actually photographing the object. This is a shortcoming typically involved with the specific photographing mode in which the lateral size of the object is compressed in a slim manner.

SUMMARY OF THE INVENTION

In view of the foregoing problems, an object of the present invention is to provide a lens-fitted photo film unit with which an optical adapter is externally combined for the purpose of an exposure in a specific photographing mode, and in which image quality can be high, and a structure can be simple.

In order to achieve the above and other objects and advantages of this invention, a lens-fitted photo film unit includes a main body pre-loaded with photo film. A taking lens is incorporated in the main body. A front cover covers a front of the main body, has a lens opening where the taking lens is disposed. An optical adapter is secured to the front cover and used for a specific photographing mode. The optical adapter includes an adapter optical element for passing object light to become incident on the taking lens. A movable support mechanism connects the adapter optical element with the front cover, wherein the movable support mechanism is shiftable between a standard position and a specific position, and when in the standard position, offsets the adapter optical element from the taking lens, and when in the specific position, sets the adapter optical element in front of the taking lens.

Furthermore, an optical element holder or holder frame has a holder opening for retaining the adapter optical element inside. The movable support mechanism connects the optical element holder with the front cover.

The adapter optical element includes a cylindrical lens for enlarging or compressing an object image in a predetermined direction.

Furthermore, an outer sheet is secured to a front face of the front cover. An opening is formed in a portion of the outer sheet for contact of the optical adapter with the front cover, for causing the optical adapter directly to contact the front cover.

In a preferred embodiment, furthermore, a viewfinder is incorporated in the main body, for observation of a photographic object through the front cover. The optical element holder includes a viewfinder field window, disposed in front of the viewfinder when in the specific position, for limiting a view field to a photographable region according to operation of the adapter optical element for the specific photographing mode.

Furthermore, an adapter body or retention panel is retained on the front cover removably. The movable support mechanism includes a pivotal shaft and a bearing portion for supporting the pivotal shaft in a rotatable manner, and the pivotal shaft and the bearing portion include one secured to the optical element holder, and a remaining one secured to the adapter body.

Furthermore, a stopper mechanism prevents the optical element holder in the standard position from moving beyond the standard position.

The stopper mechanism includes a first stopper projection, formed to project from the adapter body, and disposed close to the movable support mechanism. A second stopper projection is formed to project from the optical element holder, disposed close to the movable support mechanism, for engagement with the first stopper projection when the optical element holder is in the standard position, to prevent a downward swing beyond the standard position.

The predetermined direction is vertical, the standard position is disposed lower than the specific position, and the optical element holder when in the standard position is positioned lower than an angle of view defined by the taking lens.

Furthermore, at least one central projection portion is formed to project from the front cover about the lens opening. A receiving opening is formed in the adapter body behind the adapter optical element, for being fitted on the central projection portion, or for receiving the central projection portion.

Furthermore, a first engaging portion is formed with the adapter body. A second engaging portion is formed with the optical element holder, engaged with the first engaging portion, for retaining the optical element holder on the adapter body removably when the optical element holder is in the specific position.

Furthermore, a connection recess is formed in the front cover. A connection projection is formed to project from a rear face of the adapter body, fitted in the connection recess, for securing the adapter body to the front cover.

Furthermore, a cutout is formed in a peripheral edge of the adapter body, positioned in association with the connection projection, for keeping observable at least one portion of the connection projection.

Furthermore, a pressing projection is formed to project from one of a rear face of the optical element holder and a front face of the adapter body, for pressing a remaining one of the rear face of the optical element holder and the front face of the adapter body, to transmit pressing force of the optical element holder to the adapter body in securing to the front cover, whereby pressure for engagement is applied to the connection projection toward the front cover.

The pressing projection projects from the rear face of the optical element holder, and presses the front face of the adapter body.

The optical element holder includes a front wall having the holder opening. First and second lateral panels are formed to project from first and second lateral edges of the front wall to a rear. The pressing projection is constituted by two pressing projections, formed on a rear face of the front wall, and disposed close to the first and second lateral panels.

The front wall is curved in an arc shape convex to a front.

The movable support mechanism has a rotational axis extending along one edge of the optical element holder and the adapter body.

The one edge is a lower edge, and the bearing portion is a bearing hook.

Furthermore, a positioning hole is formed in the front cover. A positioning boss is formed to project from a rear face of the adapter body, inserted in the positioning hole for positioning.

Furthermore, a pressing projection is formed to project from an inner edge of the holder opening, for tightening a contact with a peripheral edge of the adapter optical element.

Furthermore, a retention claw is formed to project from an inner edge of the holder opening, for retaining a peripheral edge of the adapter optical element.

According to one aspect of the invention, there is provided an optical adapter for a lens-fitted photo film unit pre-loaded with photo film, and having a taking lens, and a front cover including a lens opening where the taking lens is disposed. The optical adapter comprises an adapter body or retention panel. An engaging portion secures the adapter body to the front cover. An optical element holder or holder frame has a holder opening, and is secured to the adapter body movably. An adapter optical element is retained in the holder opening, for passing object light incident thereon when set in front of the taking lens. A pressing projection is formed to project from one of a rear face of the optical element holder and a front face of the adapter body, for pressing a remaining one of the rear face of the optical element holder and the front face of the adapter body, to transmit pressing force of the optical element holder to the adapter body in securing to the lens-fitted photo film unit, whereby pressure for engagement is applied to the engaging portion toward the front cover.

According to another aspect of the invention, there is provided an optical adapter for a lens-fitted photo film unit having a taking lens, and a front cover including a lens opening where the taking lens is disposed. The optical adapter comprises an adapter optical element for being set in front of the taking lens, for passing object light incident thereon. An adapter body or retention panel is secured to the front cover behind the adapter optical element. An optical element holder or holder frame is secured to the adapter body in a removable manner, has a holder opening for retaining the adapter optical element inside.

The optical element holder is usable in place of a first optical element holder on the adapter body. The first optical element holder retains a first adapter optical element inside, the first adapter optical element is set in front of the taking lens, for passing object light incident thereon.

The adapter optical element and the first adapter optical element are at least two of a cylindrical lens, a soft focus filter, and a close-up converter lens.

Furthermore, a movable support mechanism connects the optical element holder with the adapter body in a removable manner, wherein the movable support mechanism is shiftable between a standard position and a specific position, and when in the standard position, offsets the adapter optical element from the taking lens, and when in the specific position, sets the adapter optical element in front of the taking lens.

The movable support mechanism includes a pivotal shaft and a bearing portion for supporting the pivotal shaft in a rotatable manner, and the pivotal shaft and the bearing portion include one secured to the optical element holder, and a remaining one secured to the adapter body.

The pivotal shaft contacts the bearing portion at a first engaging amount equal to or smaller than a half of a width of the bearing portion.

In a preferred embodiment, the pivotal shaft has a greater length than a width of the bearing portion.

Furthermore, a stopper mechanism prevents the optical element holder in the standard position from moving beyond the standard position.

According to still another aspect of the invention, there is provided an optical adapter for a camera including a taking lens and a front cover having a lens opening where the taking lens is disposed. An adapter optical element is set in front of the taking lens, for passing object light incident thereon. An optical element holder or holder frame is secured to the front cover in a removable manner, having a holder opening for retaining the adapter optical element inside.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
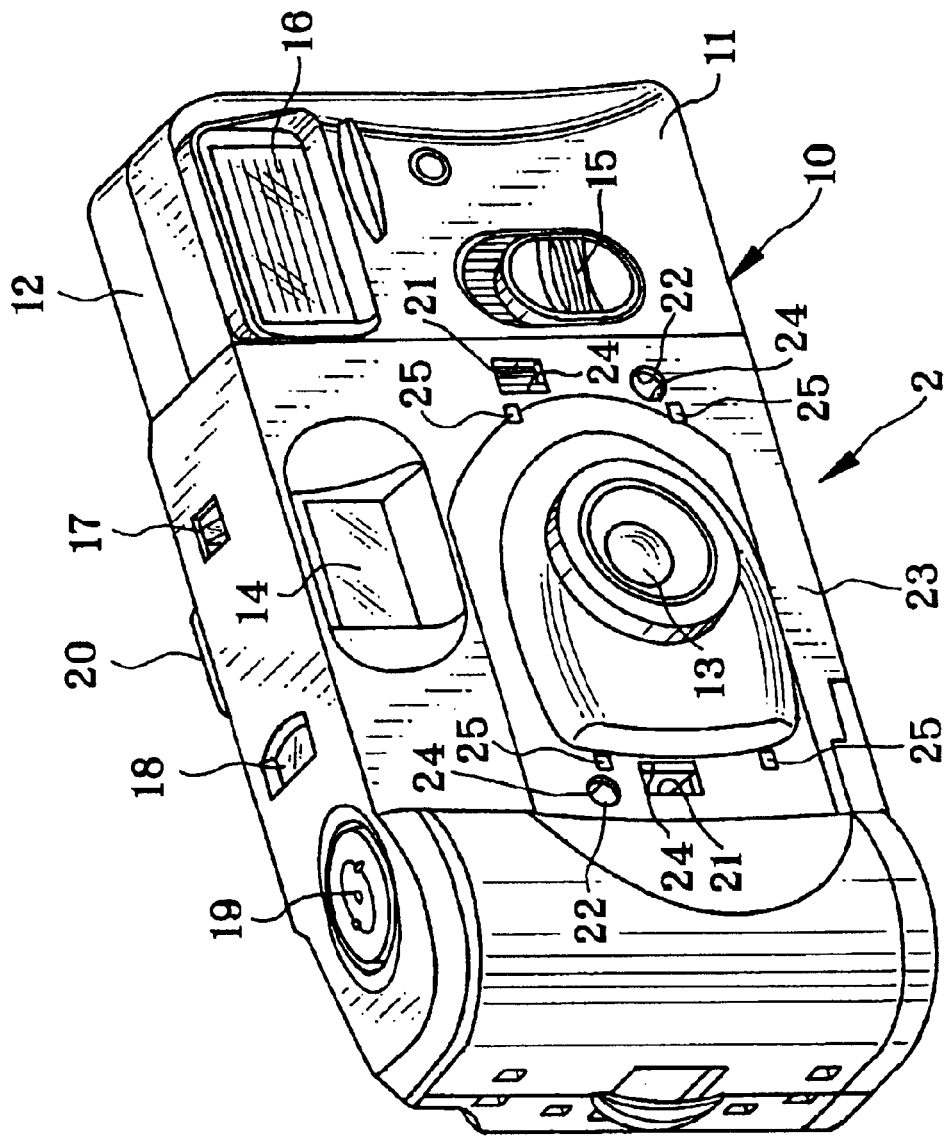
FIG. 1 is a perspective illustrating a lens-fitted photo film unit.

In FIG. 1, a lens-fitted photo film unit 2 has a main body 10, of which a front and a rear are covered by a front cover 11 and a rear cover 12. The main body 10 includes an exposure unit, a flash device, a photo film holder chamber and a cassette holder chamber. The photo film holder chamber is loaded with a roll of unexposed photo film previously drawn out of a cassette. The cassette holder chamber is loaded with the cassette, into which the photo film is wound each time that an exposure is taken. An example of the photo film is the same as depicted in a drawing of the commonly assigned patent U.S. Pat. No. 6,483,991. The front cover 11 includes various openings through which a number of relevant elements appear, including a taking lens 13, a viewfinder objective window 14, a flash charger button 15 and a flash emitter window 16.

The upside of the lens-fitted photo film unit 2 is provided with a readiness indicator 17, a frame counter 18 and a shutter release button 19. The readiness indicator 17 emits light to inform a photographing user of readiness upon the charging of the flash device. A viewfinder eyepiece window 20 appears through the rear cover 12. Two lower lids (not shown) are formed with the rear cover 12 as a single piece, and cover lower ends of the photo film holder chamber and the cassette holder chamber in a light-tight manner. The lower lid under the cassette holder chamber is opened for removing the photo film cassette after exposures. It is to be noted that a region of a photographic object observed through the viewfinder eyepiece window 20 is determined slightly smaller than a region of the object image focused through the taking lens 13.

The flash charger button 15 is slidable up and down, and operated for flash photography. The readiness indicator 17 comes to protrude up when the flash charger button 15 is operated. Upon completion of the charging, the readiness indicator 17 starts blinking to inform a photographing user of the readiness at the end of the charging. After the charging, the shutter release button 19 is depressed. Flash light is emitted by the flash emitter window 16 and applied to a photographic field at the same time as the shutter is released.

The front cover 11 is provided with a connection recess 21 and a positioning hole 22. The connection recess 21 is used to form an engagement hook 27 in the front cover 11 as one piece. See FIG. 4. The engagement hook 27 becomes engaged with an engagement hook 26 formed with the main body. The positioning hole 22 is used for fitting of a positioning ridge formed with the main body. The connection recess 21 and the positioning hole 22 are used for fixation and positioning of an adapter body or retention panel 31 of the optical adapter which will be described later in detail.

A belt-shaped outer sheet 23 covers one portion of the main body 10. Openings 24 are formed in portions of the belt-shaped outer sheet 23 corresponding to the connection recess 21 and the positioning hole 22. Openings 25 are formed in portions of the belt-shaped outer sheet 23 corresponding to positioning projections 39 of the adapter body 31 in FIG. 2. The openings 24 and 25 cause the adapter body 31 to contact the front cover 11 directly.

Figure 2:
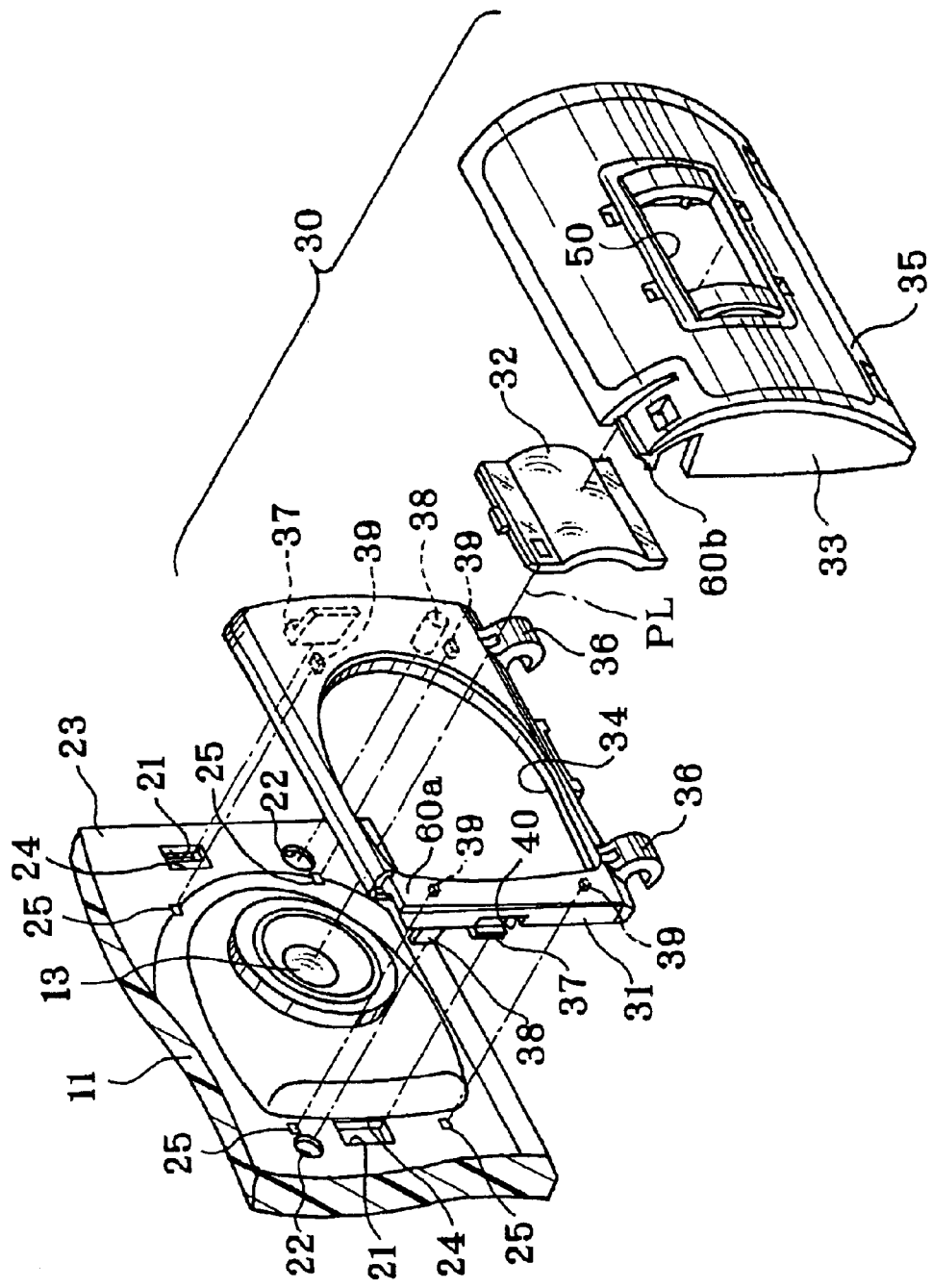
FIG. 2 is an exploded perspective illustrating an optical adapter for use with the lens-fitted photo film unit.
Figure 3:
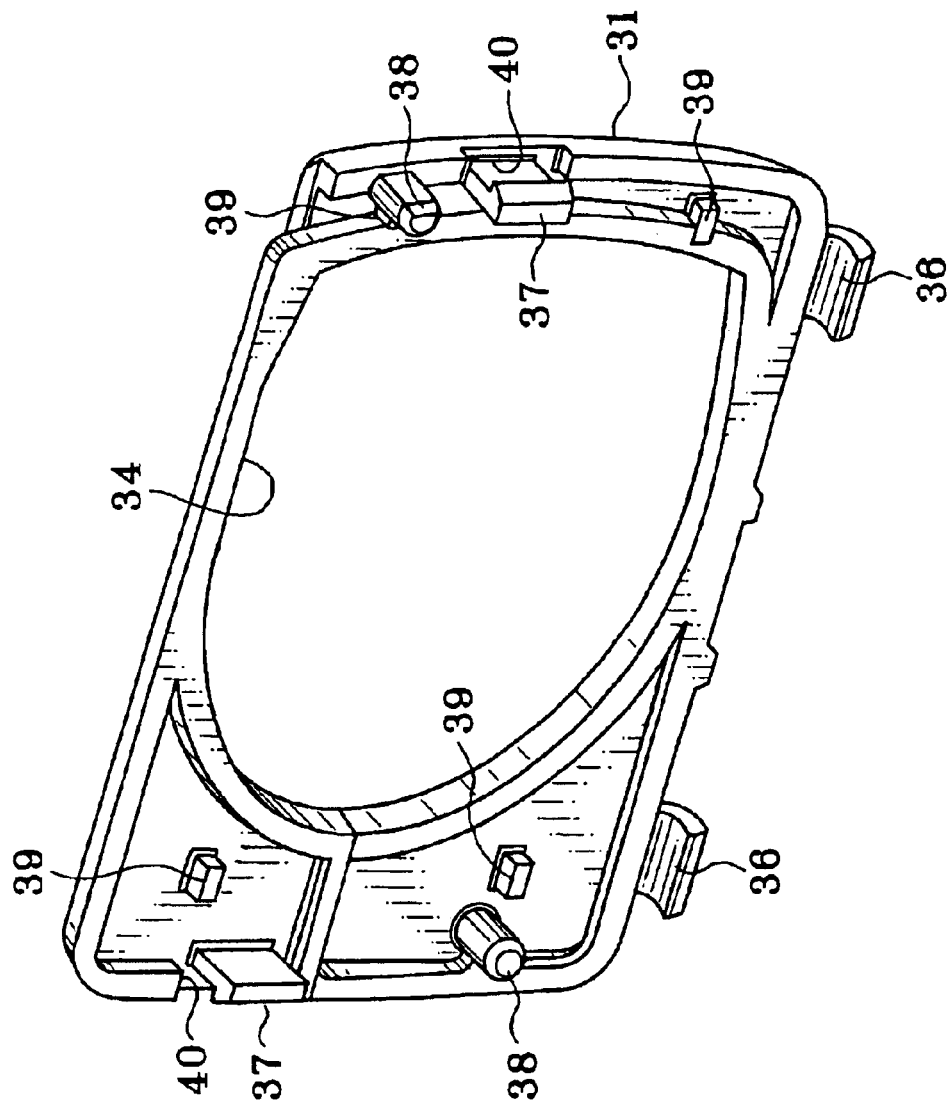
FIG. 3 is a perspective illustrating an adapter body or retention panel of the optical adapter.

In FIG. 2, an optical adapter 30 is secured to the front cover 11 for the purpose of an exposure in the specific photographing mode. The optical adapter 30 is constituted by the adapter body 31, a cylindrical lens or anamorphic lens 32 as auxiliary lens and a lens holder or holder frame 33. A receiving opening 34 is formed in the adapter body 31 for receiving a projecting portion of the front cover 11. Bearing hooks 36 are formed with a lower portion of the adapter body 31 for engagement with a pivotal shaft 35 in a rotational support mechanism or movable connector. For the pivotal shaft 35, see FIG. 6A. In FIG. 3, the rear of the adapter body 31 is provided with connection claws 37 as connection projections, a positioning projection or boss 38 and the positioning projections 39.

Figure 4:
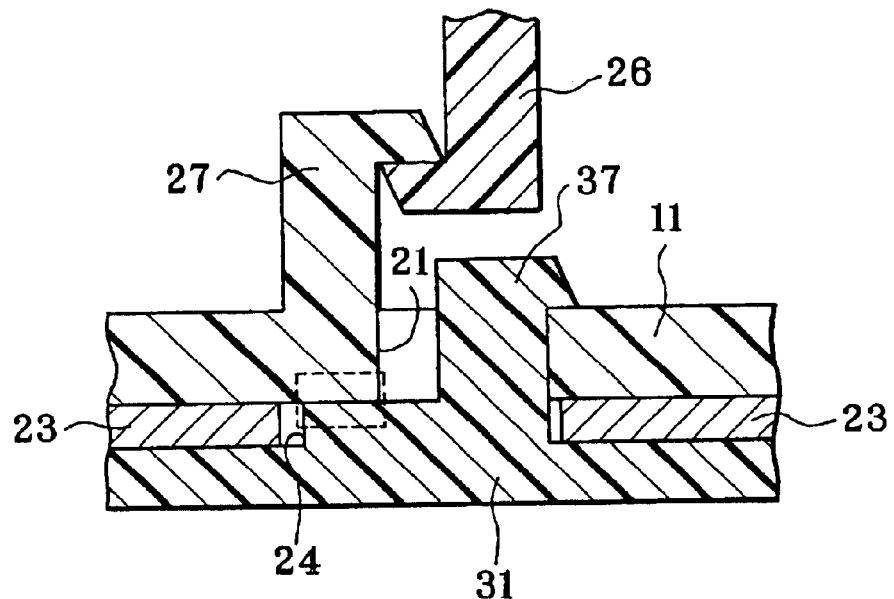
FIG. 4 is a cross section, partially broken, illustrating connection claws.

In FIG. 4, the connection claws 37 are inserted in the connection recess 21 of the front cover 11, and fitted on a rear face of the front cover 11. Thus, the adapter body 31 is fixedly secured to the front cover 11. The positioning boss 38 is inserted in the positioning hole 22 of the front cover 11, and positions the adapter body 31 in vertical and horizontal directions. This makes it possible to fix the adapter body 31 on the front cover 11 by use of the connection recess 21 and the positioning hole 22 preformed in the front cover 11 without increasing the number of the parts such as an attachment belt. The positioning of the adapter body 31 in the two-dimensional manner can be ensured.

The positioning projections 39 contact the front cover 11 directly through the openings 25 formed in the belt-shaped outer sheet 23, and position the adapter body 31 exactly in the optical axis direction PL of the taking lens 13. Portions of the connection claws 37 and the positioning boss 38 for contact with the front cover 11 contact the front cover 11 directly through the openings 24, as indicated by the square of the broken line in FIG. 4. Those elements are effective in minimizing play of the adapter body 31 in the optical axis direction PL even with flexing of the belt-shaped outer sheet 23. The image quality in the specific photographing mode can be raised.

A cutout 40 is formed in a lateral portion of the connection claws 37. After the adapter body 31 is secured to the front cover 11, the cutout 40 enables observation of a portion of the connection claws 37. This facilitates disassembly of parts after the withdrawal of the lens-fitted photo film unit 2. Note that it is possible to extend the cutout 40 along all of the lateral portion of the adapter body 31, so that flexibility of the connection claws 37 can be raised. A photographing user can exchange the optical adapter 30 manually if he or she desires so.

Figure 5:
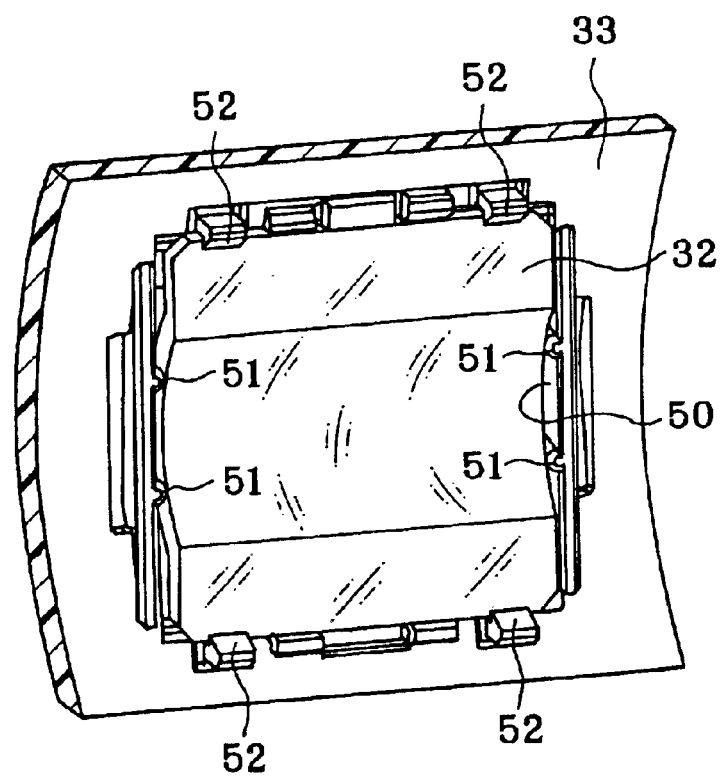
FIG. 5 is a perspective, partially broken, illustrating a lens holder or holder frame, a holder opening and a cylindrical lens fitted in the holder opening.

When an object is photographed through the cylindrical lens 32, an image being recorded is in a form where the object is extended only in the vertical direction to provide appearance with a reduced size in the horizontal direction. In FIG. 5, a holder opening 50 is formed in the lens holder 33. The cylindrical lens 32 is fitted in the holder opening 50 after insertion from the rear toward the front. Arc-shaped pressing projections 51 are formed with lateral surfaces of the holder opening 50. When the cylindrical lens 32 is fitted in the holder opening 50, the arc-shaped pressing projections 51 are pressed and lightly deformed by the lateral surfaces of the cylindrical lens 32, and keep the cylindrical lens 32 positioned in the horizontal direction without offsetting. Retention claws 52 project from upper and lower edges of the holder opening 50.

Figure 6A:
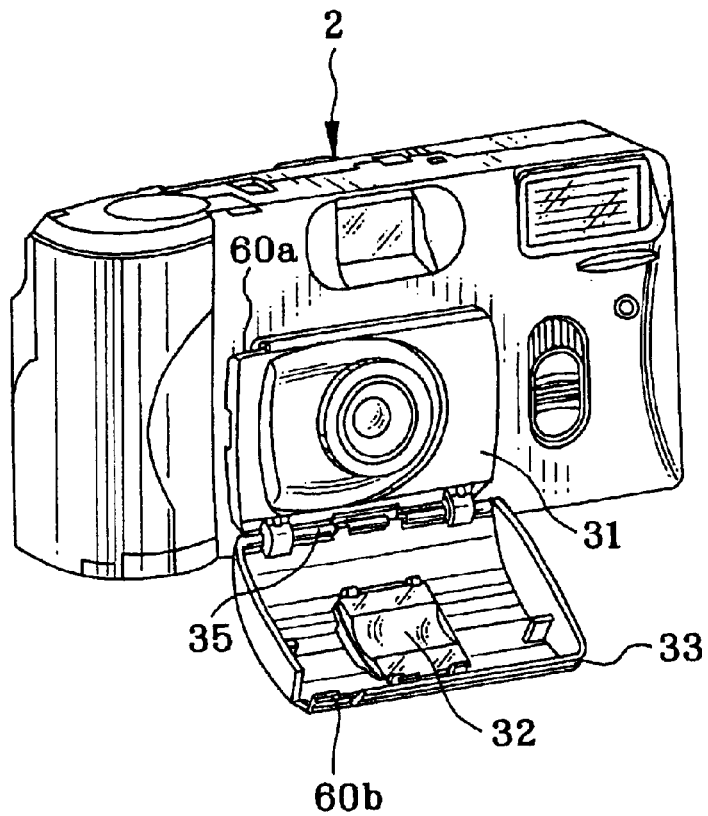
FIG. 6A is a perspective illustrating a state of a standard photographing mode.
Figure 6B:
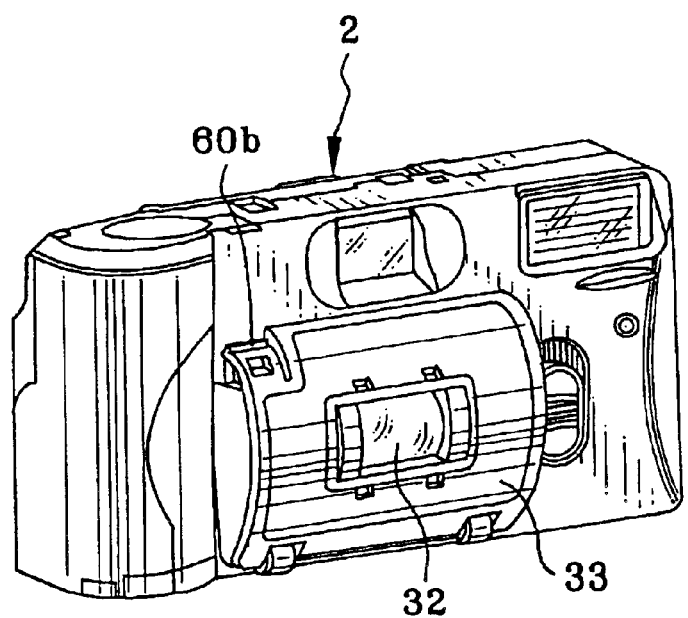
FIG. 6B is a perspective illustrating a state of a specific photographing mode.
Figure 7:
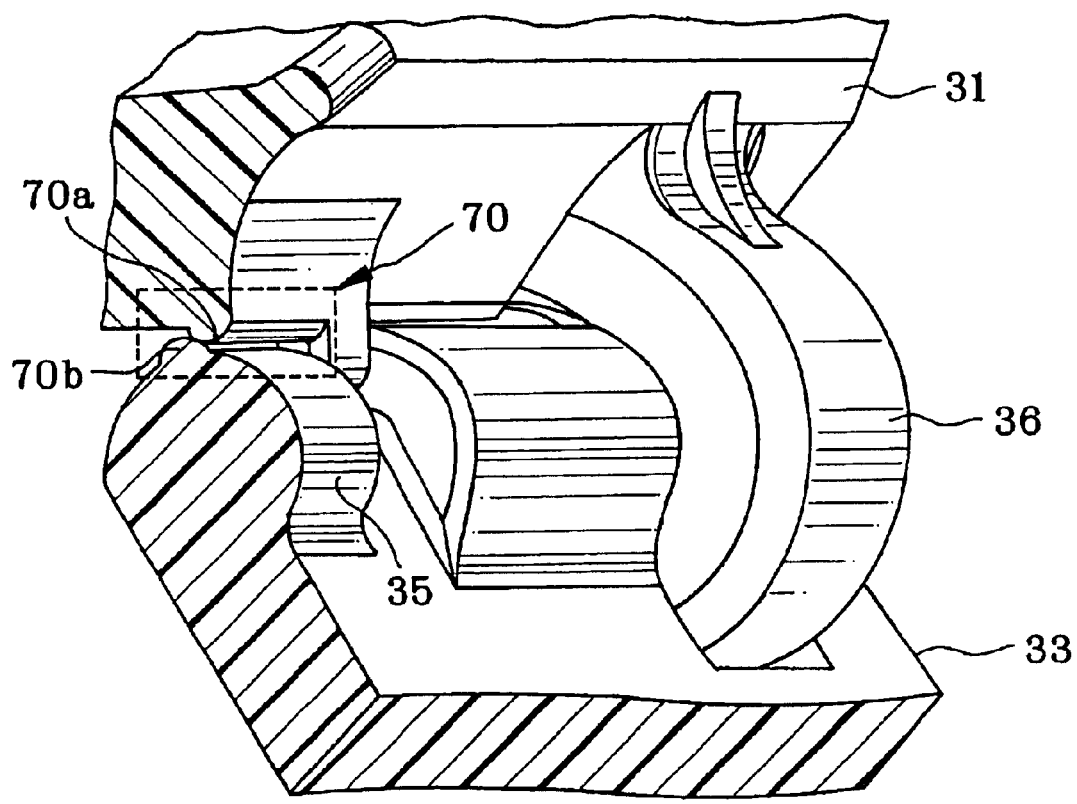
FIG. 7 is a perspective, partially broken, illustrating a stopper mechanism for the adapter body and the lens holder.

The lens holder 33 is rotationally shiftable between a standard position of FIG. 6A and a specific position of FIG. 6B, for the purpose of setting one of two photographing modes. An engagement claw 60a and an engagement hook 60b as first and second engagement portions are engaged with one another to retain the adapter body 31 and the lens holder 33 in the closed position. In FIG. 7, a stopper mechanism 70 is indicated by the broken line, and includes a first stopper projection 70a and a second stopper projection 70b. The first stopper projection 70a is formed with a lower portion of the adapter body 31. The second stopper projection 70b is formed with the pivotal shaft 35 of the lens holder 33. The stopper mechanism 70 prevents the lens holder 33 from entry into an angle of view of the taking lens 13 at the time of the standard photographing mode. The first and second stopper projections 70a and 70b are so disposed that the lens holder 33 comes away from a region defined by the angle of view of the taking lens 13 shortly before the second stopper projection 70b reaches the first stopper projection 70a. When the second stopper projection 70b reaches the first stopper projection 70a, the lens holder 33 has been out of the angle of view with a sufficient gap.

At the time of the standard photographing mode, the lens holder 33 is rotated until the second stopper projection 70b moves past the top of the first stopper projection 70a, and set in a retained manner in the standard position of FIG. 6A. At the time of the specific photographing mode, the lens holder 33 is rotated to disengage the stopper mechanism 70, set in the specific position of FIG. 6B, and engaged with the adapter body 31. It is to be noted that other structures different from the stopper mechanism 70 may be used for setting the lens holder 33 in the retained manner in the standard position. For example, a spring can be connected with the pivotal shaft 35 for biasing the lens holder 33 in the opening direction.

In the above embodiment, the connection claws 37 are used for securing the adapter body 31 on the front cover 11. However, hooks may be fitted by a forcibly pressed manner, or may be welded together for the purpose of the connection. Furthermore, the cylindrical lens 32 may have operation of compressing the object image in the horizontal direction for the purpose of a slimmed photograph. Also, other optical elements may be used for the specific photographing mode instead of the cylindrical lens 32, including a filter for the soft focus photography, a snow cross filter for the snow cross photography, and the like. Furthermore, a belt-shaped outer sheet without the openings 24 or 25 may be used to produce a normal type of lens-fitted photo film unit only for the standard photographing mode. In other words, a widely used type of lens-fitted photo film unit only for the standard photographing mode can be changed with specifics of capable of exposures in the specific photographing mode simply by reattaching the belt-shaped outer sheet 23.

Figure 8:
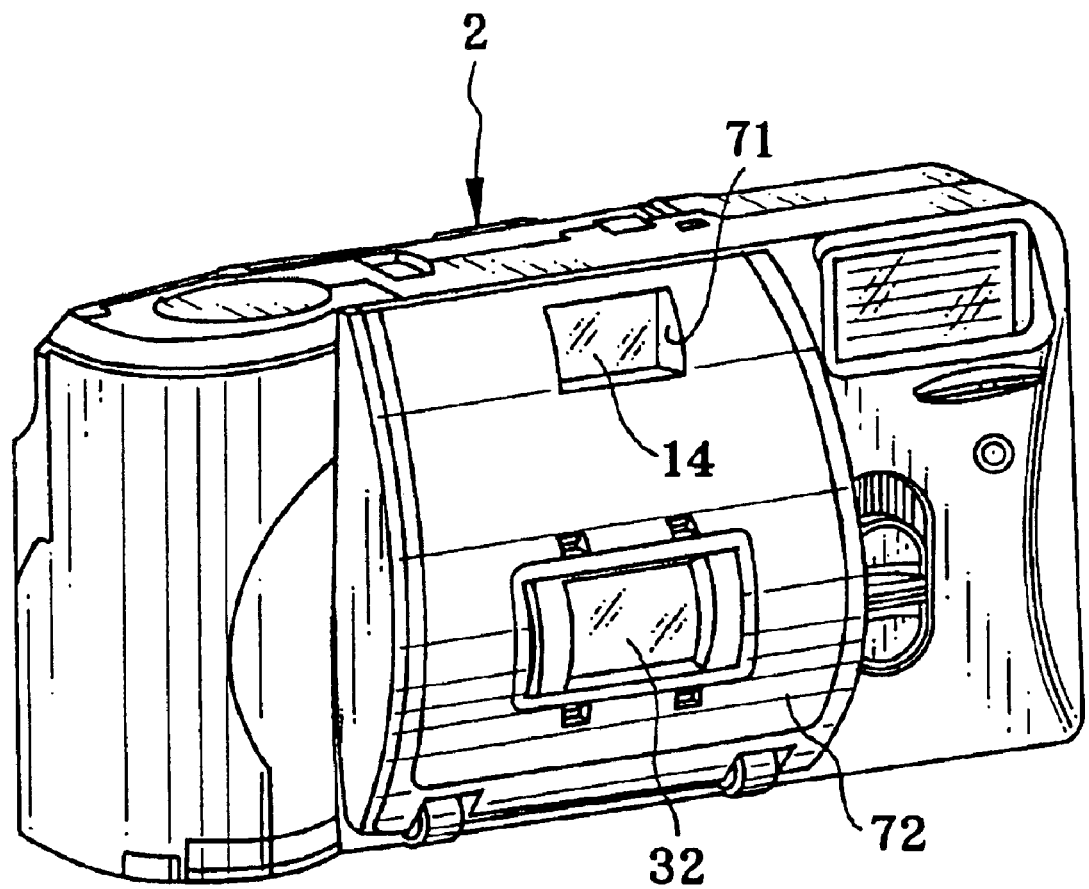
FIG. 8 is a perspective illustrating another preferred optical adapter extending to the front of a viewfinder of the lens-fitted photo film unit.

In FIG. 8, the use of another preferred lens holder or holder frame 72 is illustrated. A viewfinder field window 71 is formed in the lens holder 72, is positioned in front of the viewfinder objective window 14, and restricts a field of view observed through the viewfinder eyepiece window 20 according to a factor of extension or compression of an object image focused by the cylindrical lens 32. For example, let the cylindrical lens 32 extend an object image vertically at a factor of 10%. The viewfinder field window 71 operates to limit the object image with 10% in the vertical direction through the viewfinder eyepiece window 20. The object image observed through the viewfinder eyepiece window 20 can be substantially the same as a photographed image in both of the specific and standard photographing modes. A photographing user can take a photograph in the specific photographing mode without unnatural impression of the mode.

Figure 9:
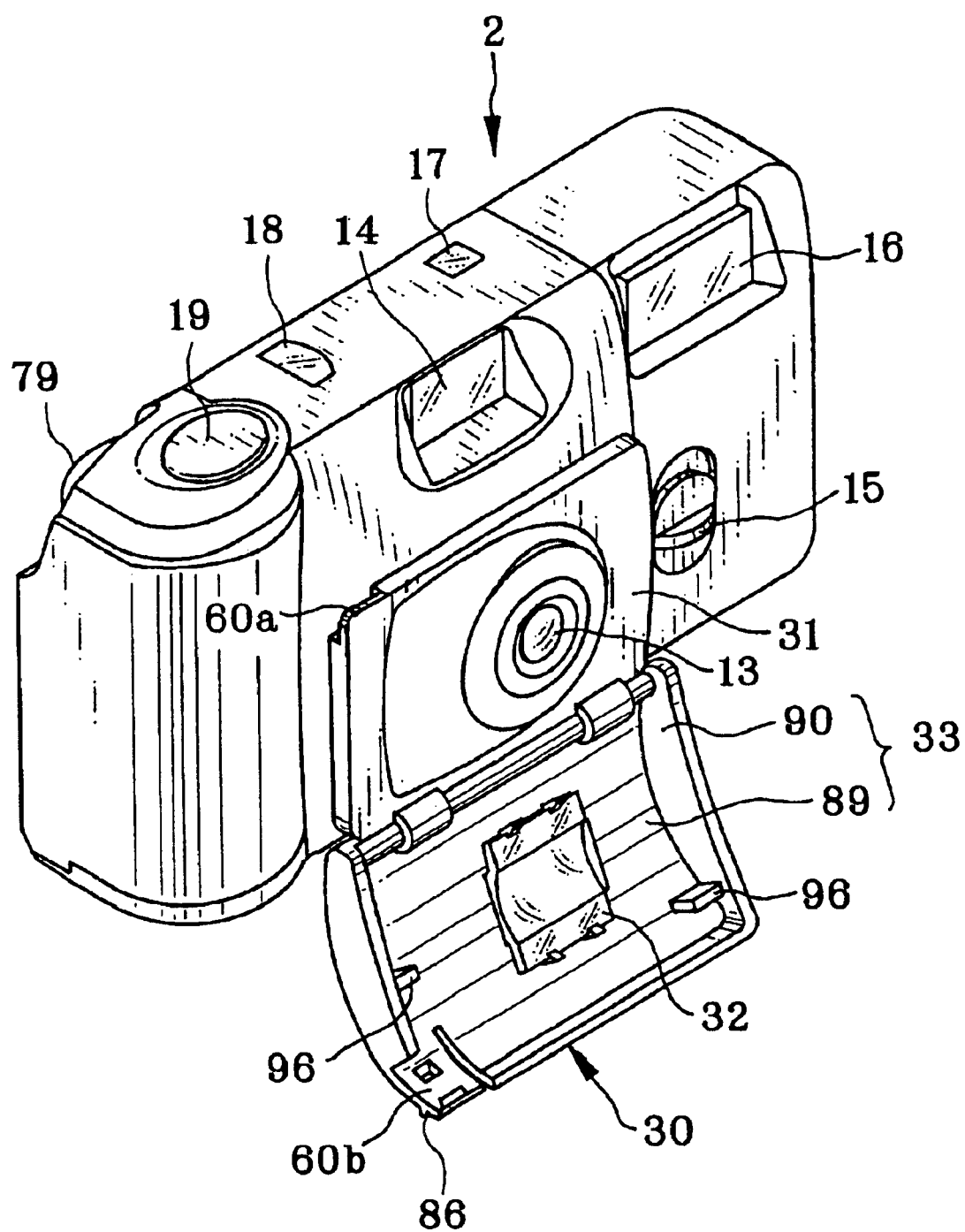
FIG. 9 is a perspective illustrating the structure of the optical adapter having pressing projections for connection with the lens-fitted photo film unit.

The lens-fitted photo film unit is now described particularly with a structure for facilitating assembly by pressing the lens holder 33 even though the lens holder 33 is disposed about the adapter body 31. In FIG. 9, the lens-fitted photo film unit 2 includes the taking lens 13, the viewfinder objective window 14, the flash emitter window 16 and the flash charger button 15. The upside of the lens-fitted photo film unit 2 has the shutter release button 19, the frame counter 18 and the readiness indicator 17. A winder wheel 79 is disposed in the rear of the lens-fitted photo film unit 2. The optical adapter 30 is disposed on the front of the lens-fitted photo film unit 2.

Figure 10:
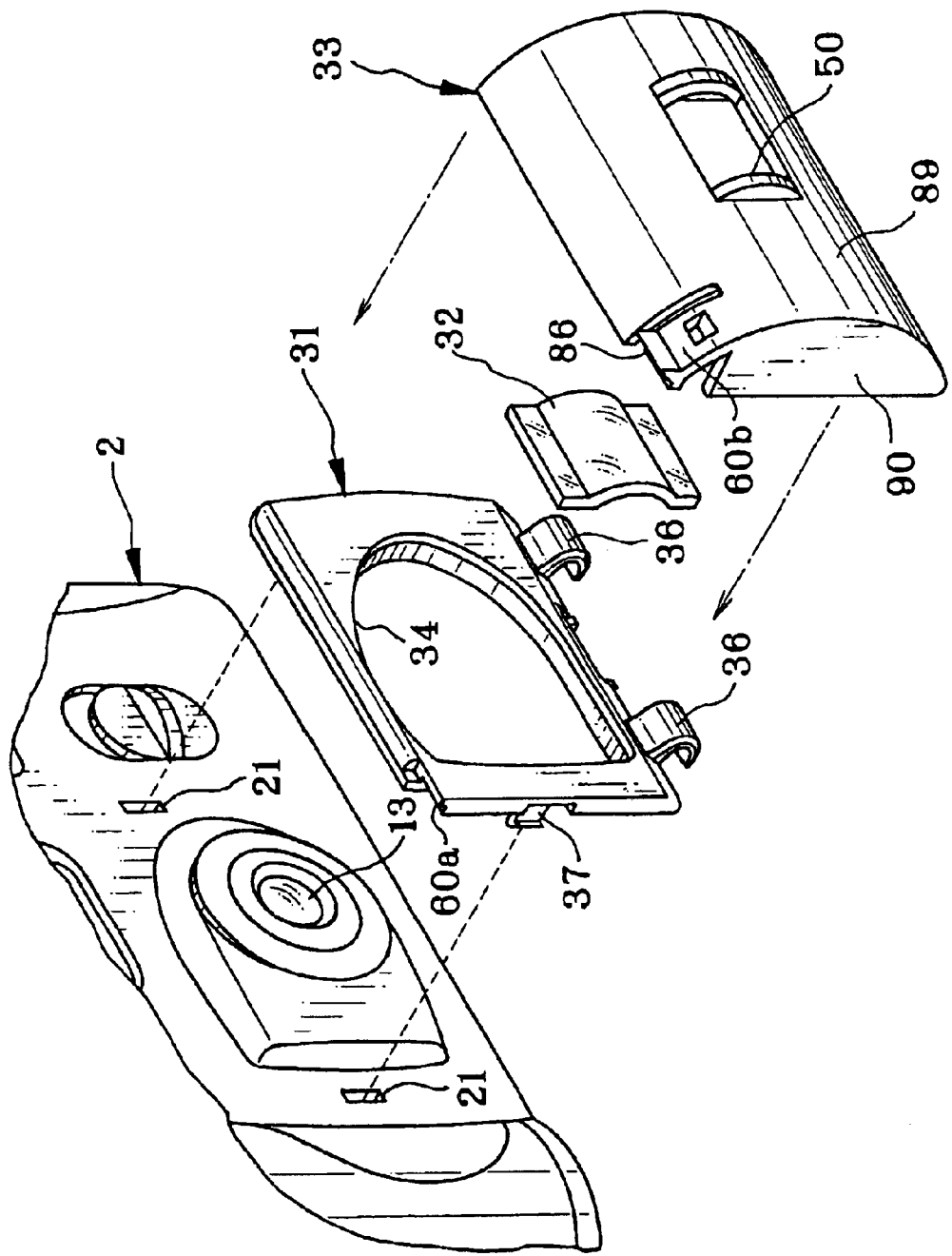
FIG. 10 is an exploded perspective illustrating the optical adapter with the lens-fitted photo film unit.

In FIGS. 9 and 10, the engagement hook 60b is formed with the lens holder 33. An end claw projects from the engagement hook 60b. The engagement claw 60a is formed on the adapter body 31, and is used to retain the end claw. In the course of closing, the lens holder 33 becomes engaged with the corner of the adapter body 31. Upon the retention of the lens holder 33 on the adapter body 31, the adapter body 31 is completely covered behind the lens holder 33. An opener button 86 is formed to project from the engagement hook 60b. When the opener button 86 is manually pulled toward the front, the engagement hook 60b is raised, to open the lens holder 33 away from the adapter body 31 by disengagement.

Figure 11:
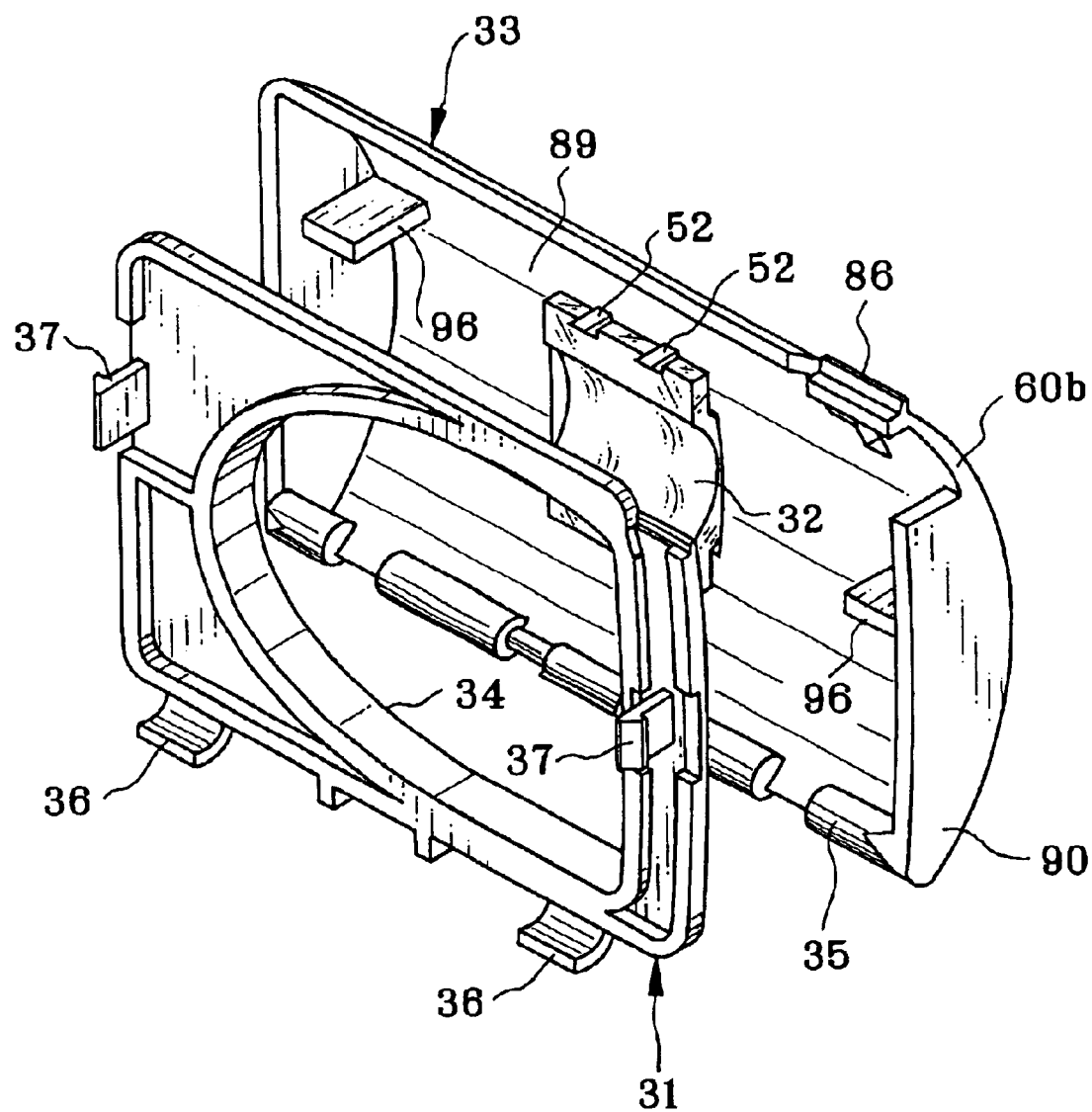
FIG. 11 is an exploded perspective illustrating the rear of the optical adapter.

In FIG. 11, pressing projections 96, the pivotal shaft 35 and the retention claws 52 are disposed inside the lens holder 33. The pivotal shaft 35 is engaged with the bearing hooks 36. The retention claws 52 retain the cylindrical lens 32. An arc-shaped front wall 89 is provided with the pressing projections 96 as one piece. Lateral panels 90 are included in the piece, and have the pressing projections 96 extending from those. The pressing projections 96 have such a height that, when the lens holder 33 is closed and pressed further toward the adapter body 31, the pressing projections 96 contact the front face of the adapter body 31. Positions of the pressing projections 96 are to press the adapter body 31 from behind the connection claws 37.

Figure 12A:
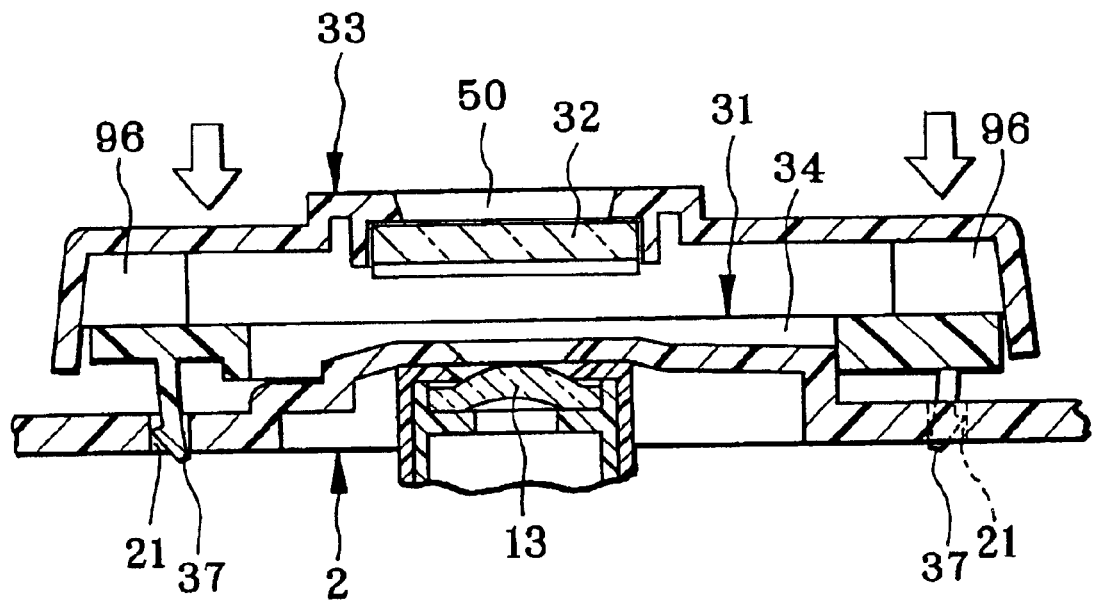
FIG. 12A is an explanatory view in cross section, illustrating a step during insertion of connection claws in a securing process of the optical adapter.
Figure 12B:
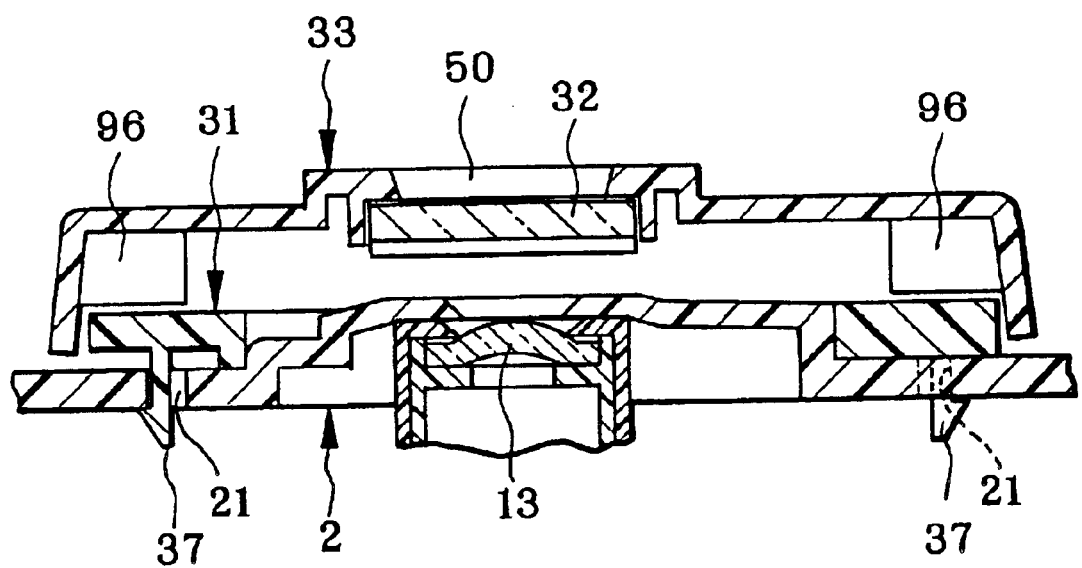
FIG. 12B is an explanatory view in cross section, illustrating a step of completion of the securing process of the optical adapter after the step of FIG. 12A

For operation of the above-described structure, FIG. 12A is referred to. The adapter body 31 is pushed back toward the lens holder 33. In the course of the push, the pressing projections 96 readily come in contact with the front of the adapter body 31. The force of pressing the lens holder 33 is transmitted by the pressing projections 96 to the front of the adapter body 31. Each of the connection claws 37 is deformed but safely inserted into the connection recess 21. Thus, the state of FIG. 12B is obtained.

In the above embodiment, the pressing projections 96 are formed with the lens holder 33 which has a sufficient thickness and is arc-shaped. Alternatively, a pressing projection or ridge may be formed on the adapter body 31. This is effective typically if the lens holder 33 has a small thickness. In any structure, the pressing projection or ridge is capable to transmit the force from the lens holder 33 to the adapter body 31. It is preferable to form a pressing projection or ridge on the adapter body 31 not in a locally protruding shape but with a small difference of the height on the front of the adapter body 31. Such a pressing projection or ridge may have such a height as to define a space from the adapter body 31 according to a distance from the front of the lens-fitted photo film unit 2 to an edge of the lens holder 33 set in the retained position for the specific photographing mode.

In the above embodiment, the connection claws 37 retain the adapter body 31 to the front of the lens-fitted photo film unit 2. However, the adapter body 31 may be retained on the front cover by insertion in a forcibly pressed manner. Also, the adapter body 31 may be connected with the lens holder 33 by hinge portions with a small thickness. For this purpose, the adapter body 31 and the lens holder 33 can be one piece formed from polypropylene resin or other flexible material.

Figure 13:
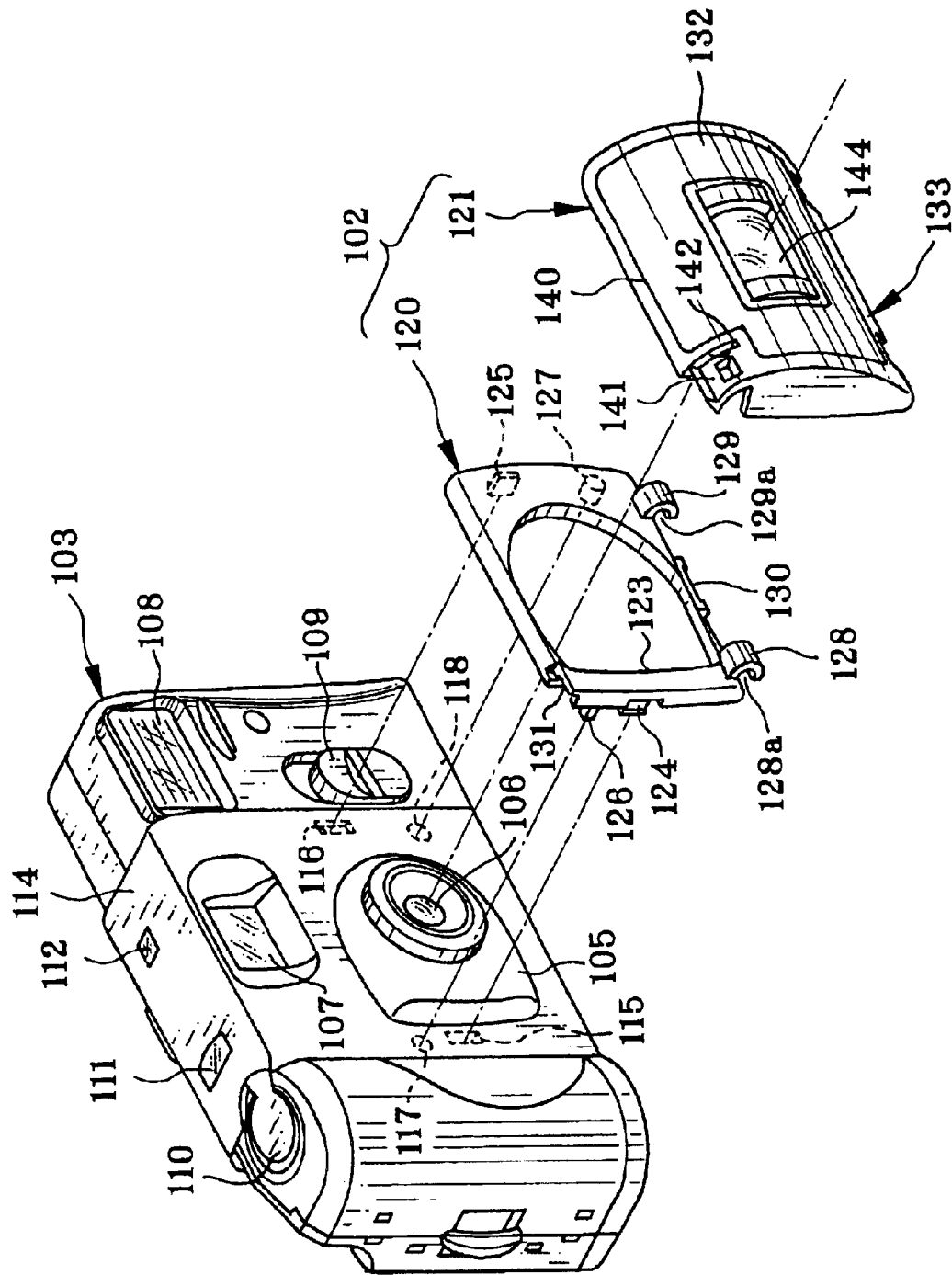
FIG. 13 is an exploded perspective illustrating another preferred lens-fitted photo film unit with an optical adapter.

In FIG. 13, another preferred optical adapter 102 for use with a lens-fitted photo film unit 103 is illustrated. The lens-fitted photo film unit 103 is a commercially available type sold with the trade name of Quick Snap Simple Ace.

The front of the lens-fitted photo film unit 103 is provided with a central projection portion 105, a taking lens 106, a viewfinder objective window 107, a flash emitter 108 and a flash charger button 109. The upside of the lens-fitted photo film unit 103 has a shutter release button 110, a frame counter 111 and a readiness indicator 112. The frame counter 111 indicates the number of remaining available frames. The readiness indicator 112 indicates readiness after the charging of the flash. The rear of the lens-fitted photo film unit 103 has an eyepiece viewfinder window and a winder wheel, which is used to wind an exposed portion of the photo film.

A belt-shaped outer sheet 114 is attached to the center of the lens-fitted photo film unit 103 as viewed in its longitudinal direction. Connection holes 115 and 116 are formed in the lens-fitted photo film unit 103 in the course of molding a part. Positioning holes 117 and 118 are formed in the lens-fitted photo film unit 103 for the purpose of assembly and inspection. The belt-shaped outer sheet 114 covers the connection holes 115 and 116 and the positioning holes 117 and 118. Also, information is printed on the belt-shaped outer sheet 114 for a photographing user to know how to use. Various openings are formed in the belt-shaped outer sheet 114 for appearance of the central projection portion 105, the viewfinder objective window 107, the frame counter 111 and other relevant elements.

Figure 14:
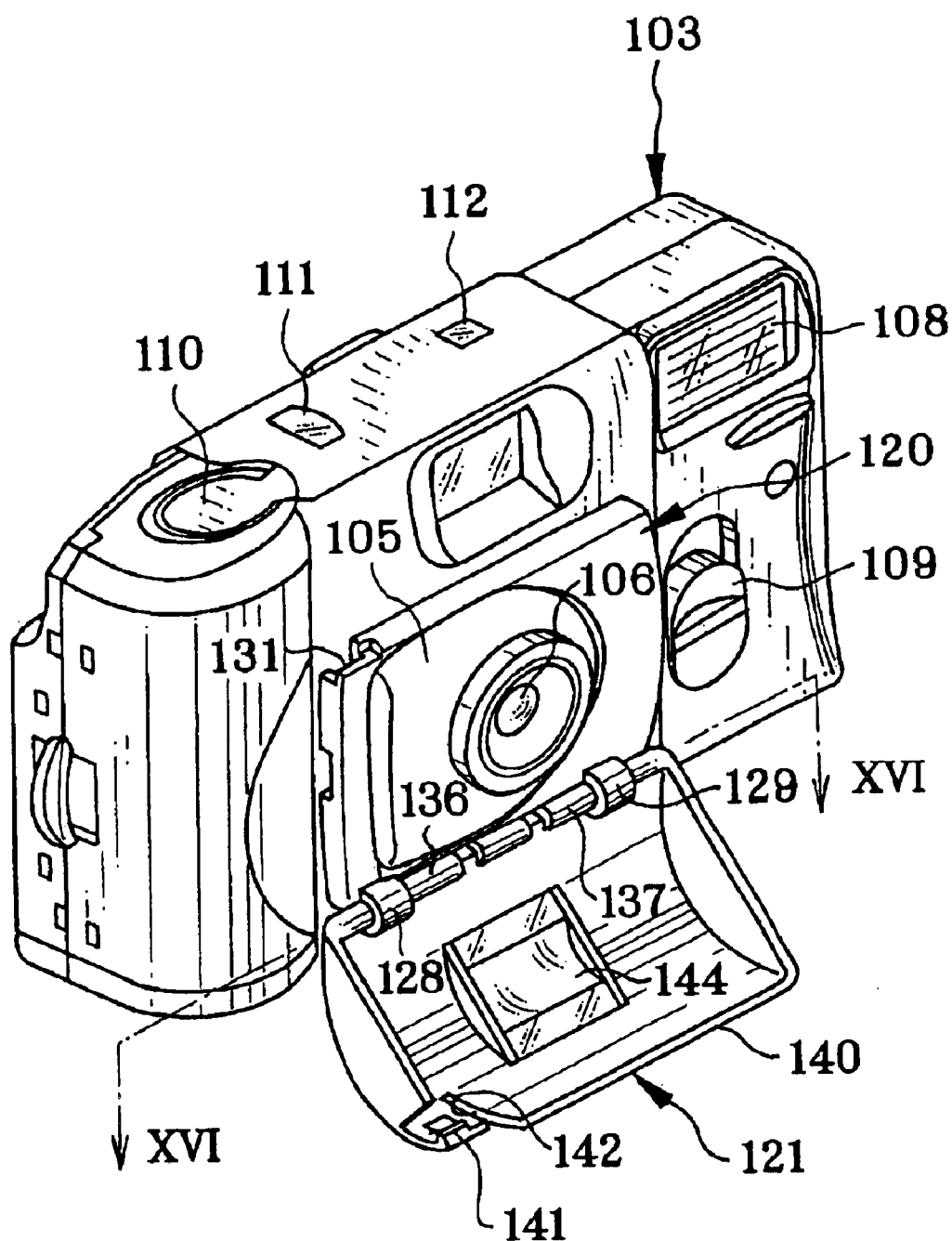
FIG. 14 is a perspective illustrating a state of openness of the optical adapter on the lens-fitted photo film unit.

The optical adapter 102 includes an adapter body or retention panel 120 and a cylindrical lens holder 121. The adapter body 120 is secured to the front of the lens-fitted photo film unit 103. The cylindrical lens holder 121 is removably secured to the adapter body 120. In FIG. 14, the adapter body 120 of the optical adapter 102 is secured to the front of the lens-fitted photo film unit 103. The cylindrical lens holder 121 is supported on the adapter body 120 in a rotatable manner. When the cylindrical lens holder 121 in the specific photographing mode is located in front of the taking lens 106, an exposure can be taken through the optical adapter 102 functioning for the specific purpose. When the cylindrical lens holder 121 in the standard photographing mode is away from the front of the taking lens 106, it is possible to take an exposure in the standard manner without the use of the optical adapter 102.

The adapter body 120 is a panel-formed part in a quadrilateral shape. A receiving opening 123 is formed in the adapter body 120 at the center for insertion of the central projection portion 105. Connection hooks 124 and 125 are formed to project from the rear of the adapter body 120 or engagement with the connection holes 115 and 116 in the front of the lens-fitted photo film unit 103. Positioning projections 126 and 127 are formed to project from the rear of the adapter body 120 for being positioned in the positioning holes 117 and 118.

A lower portion of the adapter body 120 includes arc-shaped bearing hooks 128 and 129 and a first stopper projection or ridge 130. The bearing hooks 128 and 129 support the cylindrical lens holder 121 in a rotatable manner. The first stopper projection 130 sets the cylindrical lens holder 121 in a retained manner upon rotation of the cylindrical lens holder 121 to the standard photographing mode. An engagement claw 131 projects from an upper portion of the adapter body 120, and operates for retaining the cylindrical lens holder 121 upon rotation of the cylindrical lens holder 121 to the specific position.

Figure 15:
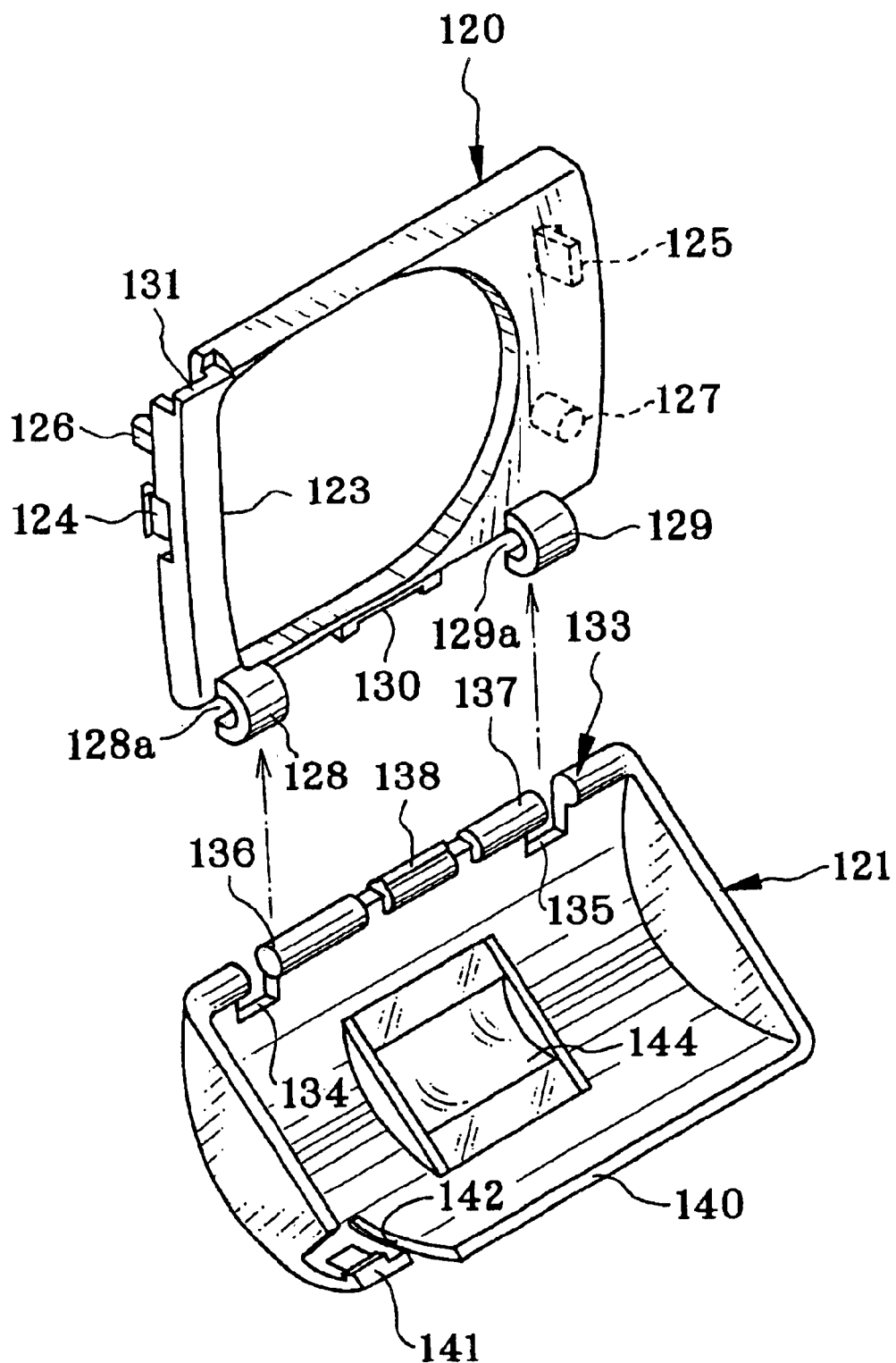
FIG. 15 is an exploded perspective illustrating the optical adapter.

The cylindrical lens holder 121 is in a semi-cylindrical shape. An outer sticker 132 is attached to the cylindrical lens holder 121. In FIG. 15, the cylindrical lens holder 121 has a lower edge 133. Cutouts 134 and 135 are formed in the lower edge 133, and receive insertion of the bearing hooks 128 and 129 of the adapter body 120. Pivotal shafts 136 and 137 in the movable support mechanism are formed with the lower edge 133, and inserted in the bearing hooks 128 and 129. A second stopper projection 138 as a stopper mechanism is formed on the lower edge 133, contacts the first stopper projection 130 of the adapter body 120, and provides a lightly retained state in the course of rotation of the cylindrical lens holder 121 toward the standard photographing mode.

Figure 16:
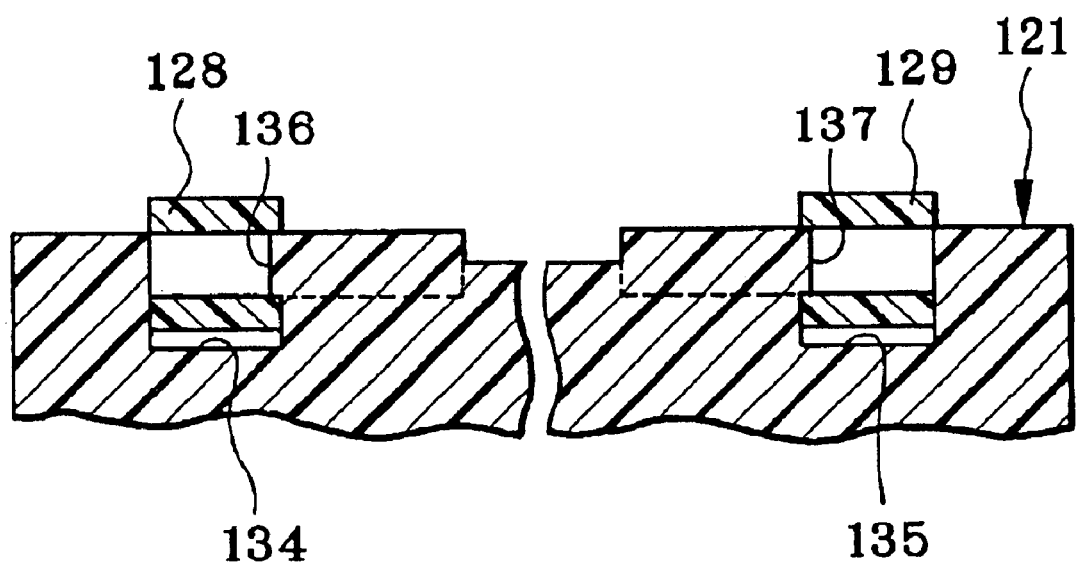
FIG. 16 is a cross section, partially broken, taken on line XVI—XVI in FIG. 14.

FIG. 16 is a section taken on line XVI—XVI in FIG. 14. The pivotal shafts 136 and 137 have a considerably small length. A width of engagement of the pivotal shafts 136 and 137 with the bearing hooks 128 and 129 is equal to or less than half as much as the size of the bearing hooks 128 and 129 in their width direction. This is for the purpose of facilitating exchange of the cylindrical lens holder 121 by encouraging the removal of the cylindrical lens holder 121 from the adapter body 120. When load or external force is applied to the cylindrical lens holder 121, the cylindrical lens holder 121 becomes removed before application of the force to the adapter body 120 or the lens-fitted photo film unit 103. There occurs no damage of the adapter body 120 or the lens-fitted photo film unit 103.

Gaps 128a and 129a are formed in the bearing hooks 128 and 129, are open toward the rear, for insertion of a pivotal shaft of the cylindrical lens holder 121. This is effective in keeping the cylindrical lens holder 121 engaged with the adapter body 120 without removal even though the pivotal shafts 136 and 137 have a small length.

The cylindrical lens holder 121 has an upper edge 140. An engagement hook 141 projects from the upper edge 140 for engagement with the engagement claw 131 of the adapter body 120. A slit 142 is formed in the cylindrical lens holder 121 to impart flexibility to the engagement hook 141.

Figure 17:
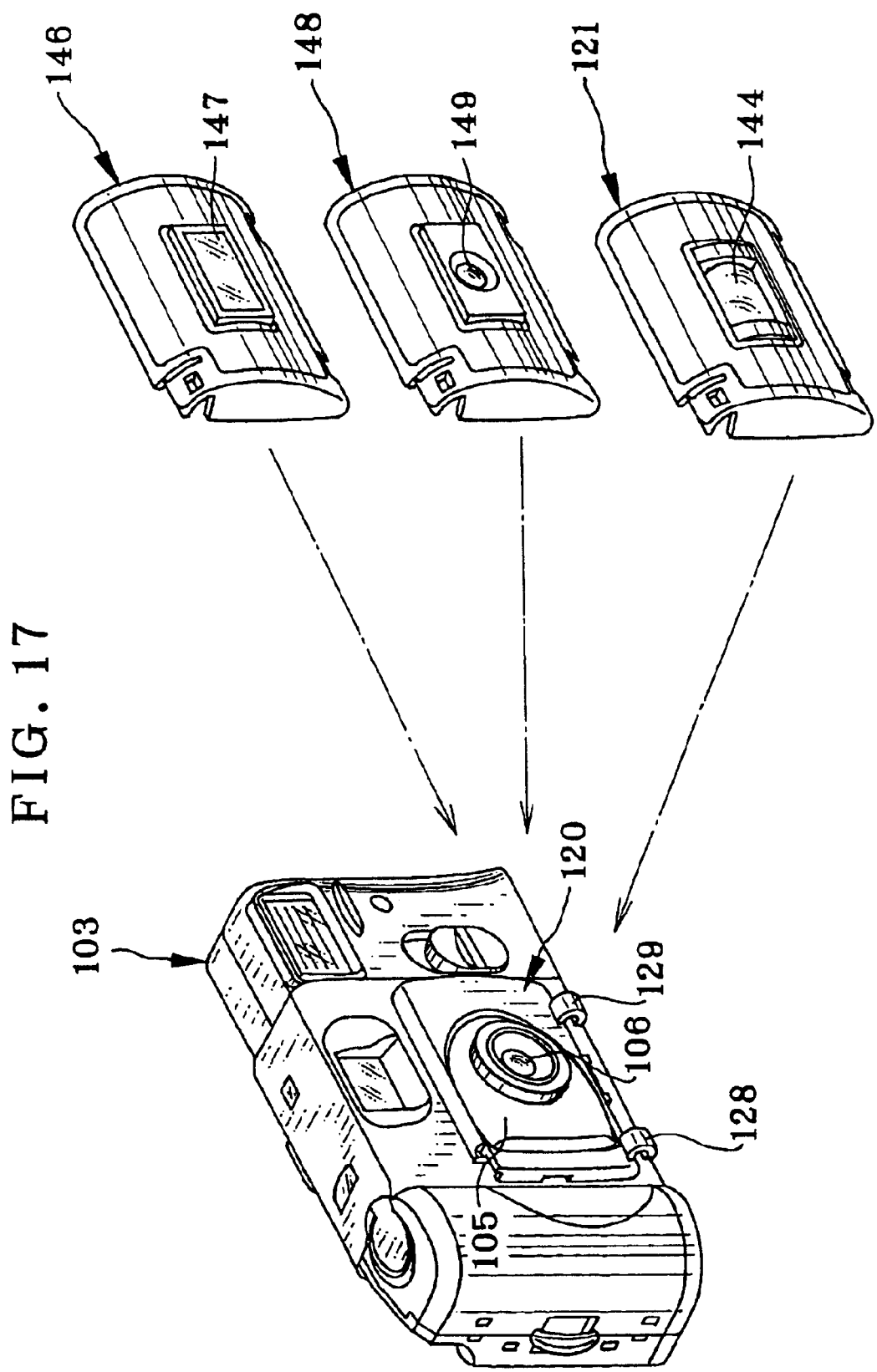
FIG. 17 is a perspective illustrating the lens-fitted photo film unit and selectively usable optical element holders of plural types.

An anamorphic lens or cylindrical lens 144 is mounted in the center of the cylindrical lens holder 121 as auxiliary lens known in the art of the lens. The cylindrical lens 144 compresses the shape of an object image in the horizontal direction in photographing the image. In FIG. 17, a soft focus filter 147 as adapter optical element is mounted in a soft focus filter holder 146. A close-up converter lens 149 as auxiliary lens is mounted in a close-up lens holder 148. Thus, optical element holders for various purposes are constructed.

In operation of the embodiment, at first the specific photographing mode is set. The adapter body 120 of the optical adapter 102 is secured to the front of the lens-fitted photo film unit 103. In FIG. 13, the belt-shaped outer sheet 114 attached to the lens-fitted photo film unit 103 covers the connection holes 115 and 116 for engagement with the connection hooks 124 and 125 of the adapter body 120, and covers the positioning holes 117 and 118 for insertion of the positioning projections 126 and 127. However, the adapter body 120 is pressed against the front of the lens-fitted photo film unit 103 by inserting the central projection portion 105 into the receiving opening 123 of the adapter body 120. The belt-shaped outer sheet 114 is broken by the connection hooks 124 and 125 and the positioning projections 126 and 127. The adapter body 120 is fixedly secured to the front of the lens-fitted photo film unit 103.

In FIG. 17, an optical element holder or holder frame for use with the adapter body 120 can be one of the cylindrical lens holder 121, the soft focus filter holder 146, the close-up lens holder 148 and the like. A photographing user selects and buys his or her intended one of those for the purpose of taking exposures.

When the cylindrical lens holder 121 is used for example, the pivotal shafts 136 and 137 of the cylindrical lens holder 121 are inserted in the bearing hooks 128 and 129 of the adapter body 120, to connect the cylindrical lens holder 121 with the adapter body 120. See FIGS. 15 and 16. The pivotal shafts 136 and 137 have a very small length. It is possible to set the cylindrical lens holder 121 easily without removing the adapter body 120 from the lens-fitted photo film unit 103.

When the specific photographing mode by using the optical adapter 102 is set, the cylindrical lens holder 121 may be set in the specific position. The cylindrical lens 144 in the cylindrical lens holder 121 is disposed in front of the taking lens 106. When the shutter is released, an object image is recorded in a form compressed in the horizontal direction.

To take an exposure in the standard photographing mode with the cylindrical lens holder 121 without using the optical adapter 102, the cylindrical lens holder 121 can be rotated to the standard position of FIG. 14. The front of the taking lens 106 becomes uncovered. An exposure can be taken according to the original angle of view of the taking lens 106.

If a specific photographing mode different from the anamorphic photographing mode is designatged, the cylindrical lens holder 121 can be removed from the adapter body 120 with the adapter body 120 retained on the lens-fitted photo film unit 103. Another optical element holder of a different type may be fitted on the lens-fitted photo film unit 103. All of the types of the optical element holders can be easily secured to and removed from the adapter body 120.

Figure 18:
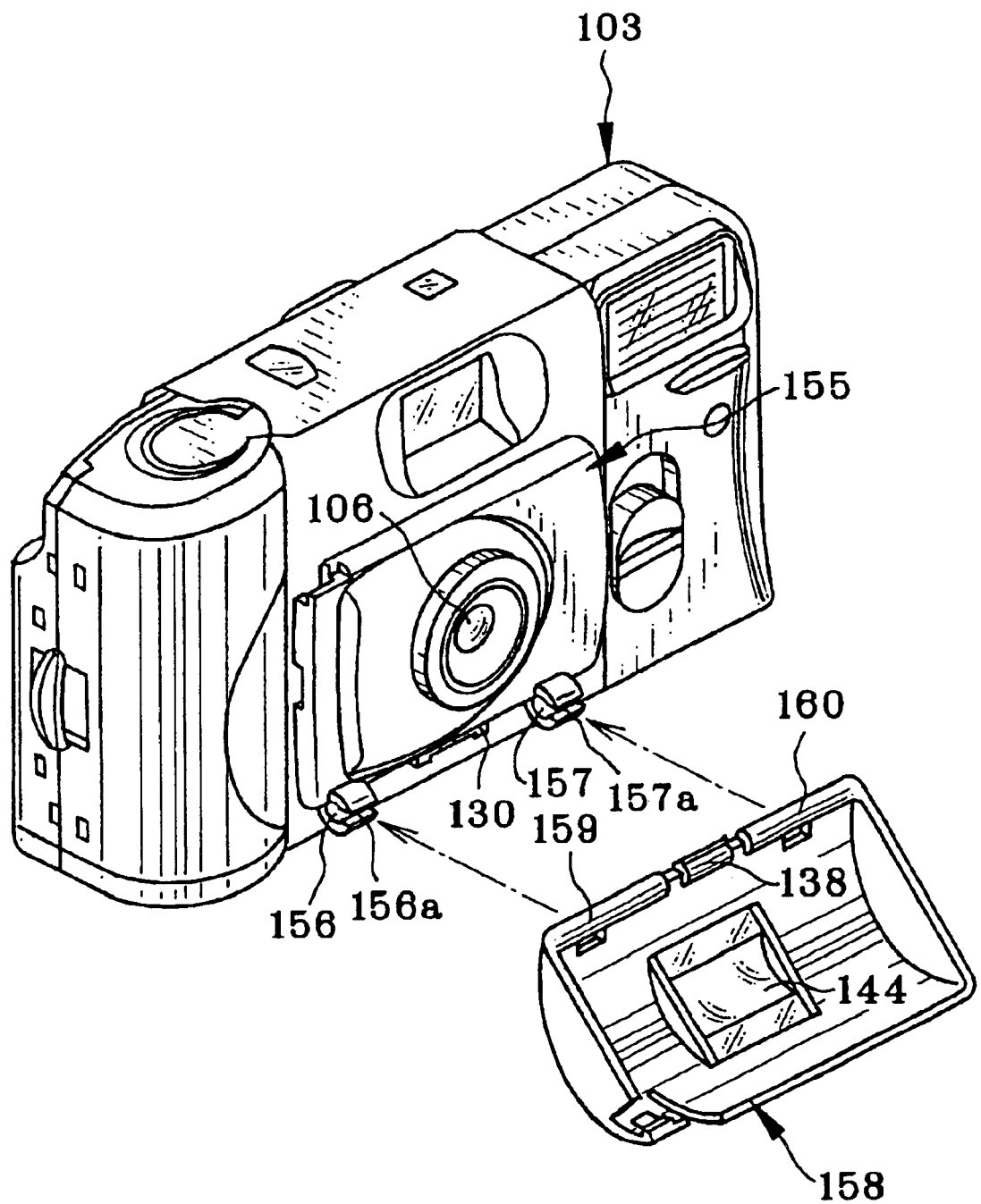
FIG. 18 is a perspective illustrating another preferred optical adapter together with a lens-fitted photo film unit.

In the above embodiment, the gaps 128a and 129a of the bearing hooks 128 and 129 are open to the rear for the easy securing and removal. The pivotal shafts 136 and 137 of the cylindrical lens holder 121 are formed considerably short. In FIG. 18, another preferred retention panel 155 is illustrated, in which bearing portions 156 and 157 in the movable support mechanism are provided with gaps 156a and 157a open toward the front. A lens holder or holder frame 158 includes pivotal shafts 159 and 160 in the movable support mechanism. The pivotal shafts 159 and 160 have such a length as to be engaged with the whole ranges of the bearing portions 156 and 157. The resiliency of the bearing portions 156 and 157 may be adjusted, so the lens holder 158 can be supported without accidental disassembly and in an easily changeable structure.

Figure 19:
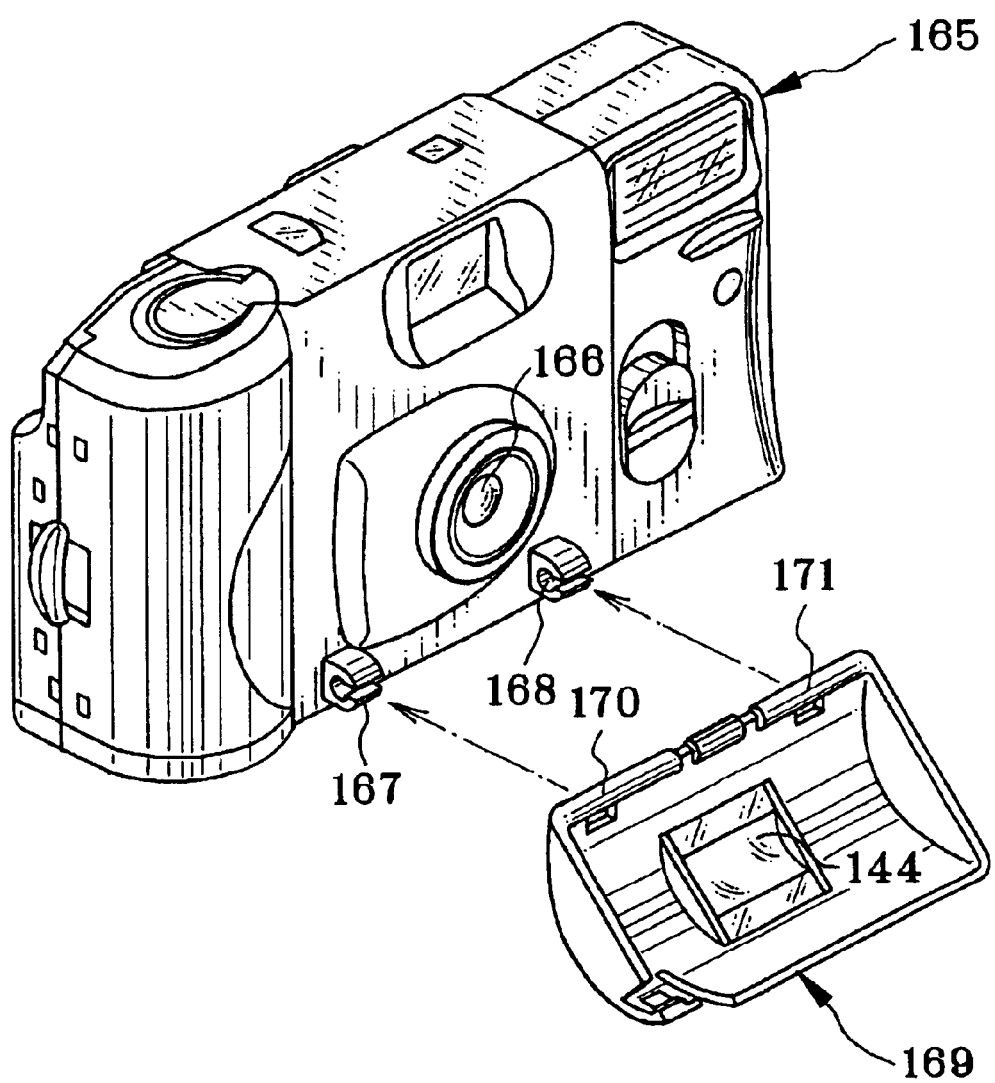
FIG. 19 is a perspective illustrating still another preferred optical adapter together with a lens-fitted photo film unit.

In FIG. 19, another preferred lens-fitted photo film unit 165 is illustrated. There are bearing portions 167 and 168 disposed under a taking lens 166. A lens holder or holder frame 169 includes pivotal shafts 170 and 171, which are engaged with the bearing portions 167 and 168. In other words, an adapter body or retention panel is included in a front cover as one portion. Consequently, it is possible not to use an adapter body or retention panel. A manufacturing cost of the lens-fitted photo film unit 165 with the changeable structure can be reduced.

In any of the above embodiments, the optical adapter is used with the lens-fitted photo film unit. However, the optical adapter of the invention may be used in a compact camera or any suitable simple camera which does not have filter screws.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit including a main body pre-loaded with photo film, comprising:

a taking lens disposed in said main body;

a front cover for covering a front of said main body, and having a lens opening where said taking lens appears; and an optical adapter, secured to said front cover, and having an auxiliary lens movable to and away from an optical axis of said taking lens;

wherein said auxiliary lens includes a cylindrical lens for enlarging or compressing an object image in a predetermined direction.

2. A lens-fitted photo film unit as defined in claim 1, wherein said optical adapter includes:

an adapter body secured to said front cover; and a lens holder for holding said auxiliary lens, wherein said lens holder is secured to said adapter body movably between a standard photographing position and a specific photographing position, and when set in said standard position, positions said auxiliary lens away from said optical axis, and when set in said specific position, positions said auxiliary lens on said optical axis.

3. A lens-fitted photo film unit as defined in claim 2, further comprising:
   an outer sheet secured to a front face of said front cover; and
   an opening formed in a portion of said outer sheet for positioning of said adapter body, for causing said optical adapter directly to contact said front cover.

4. A lens-fitted photo film unit as defined in claim 2, further comprising a viewfinder, incorporated in said main body, for observation of a photographic object through said front cover;
   said lens holder includes a viewfinder field window, disposed in front of said viewfinder when in said specific position, for limiting a view field to a photographable region according to optical operation of said auxiliary lens.

5. A lens-fitted photo film unit including a main body pre-loaded with photo film, comprising:
   a taking lens disposed in said main body;
   a front cover for covering a front of said main body, and having a lens opening where said taking lens appears; and
   an optical adapter, secured to said front cover, and having an auxiliary lens movable to and away from an optical axis of said taking lens, said optical adapter comprising:
      an adapter body secured to said front cover; and
      a lens holder for holding said auxiliary lens, wherein said lens holder is secured to said adapter body movably between a standard photographing position and a specific photographing position, and when set in said standard position, positions said auxiliary lens away from said optical axis, and when set in said specific position, positions said auxiliary lens on said optical axis;
   a pivotal shaft formed with a first one of said adapter body and said lens holder, and an engaging portion, formed with a second one of said adapter body and said lens holder, for engagement with said pivotal shaft in a rotatable manner;
   wherein said engaging portion comprises a partially open bearing hook.

6. A lens-fitted photo film unit as defined in claim 5, wherein said pivotal shaft is formed with an underside of said lens holder, and said engaging portion is formed with an underside of said adapter body.

7. A lens-fitted photo film unit as defined in claim 6, further comprising a stopper mechanism for preventing said lens holder in said standard position from moving beyond said standard position.

8. A lens-fitted photo film unit as defined in claim 7, wherein said stopper mechanism includes:
   a first stopper projection, formed to project from said adapter body, and disposed close to said bearing hook; and
   a second stopper projection, formed to project from said lens holder, disposed close to said pivotal shaft, for engagement with said first stopper projection when said lens holder is in said standard position, to prevent a downward swing beyond said standard position.

9. A lens-fitted photo film unit as defined in claim 5, further comprising:
   at least one central projection portion formed on said front cover to project from said front cover about said lens opening;
   a receiving opening, formed in said adapter body, for receiving said central projection portion.

10. A lens-fitted photo film unit as defined in claim 5, further comprising:
    a first engaging portion formed with said adapter body; and
    a second engaging portion formed with said lens holder, engaged with said first engaging portion, for retaining said lens holder on said adapter body removably when said lens holder is in said specific position.

11. A lens-fitted photo film unit as defined in claim 5, wherein said lens holder includes:
    a front wall having an opening for keeping said auxiliary lens inside;
    first and second lateral panels formed to project from first and second lateral edges of said front wall to a rear.

12. A lens-fitted photo film unit as defined in claim 11, wherein said front wall is curved in an arc shape convex to a front.

13. A lens-fitted photo film unit as defined in claim 5, wherein said lens holder further includes plural retention claws for retaining said auxiliary lens.

14. A lens-fitted photo film unit as defined in claim 13, wherein said lens holder further includes plural pressing projections for keeping said auxiliary lens positioned.

15. A lens-fitted photo film unit including a main body pre-loaded with photo film, comprising:
    a taking lens disposed in said main body;
    a front cover for covering a front of said main body, and having a lens opening where said taking lens appears; and
    an optical adapter, secured to said front cover, and having an auxiliary lens movable to and away from an optical axis of said taking lens, said optical adapter comprising:
       an adapter body secured to said front cover; and
       a lens holder rotatably attached to the adapter body for holding said auxiliary lens, wherein said lens holder is secured to said adapter body movably between a standard photographing position and a specific photographing position, and when set in said standard position, positions said auxiliary lens away from said optical axis, and when set in said specific position, positions said auxiliary lens on said optical axis;
    a connection recess formed in said front cover; and
    a connection projection, formed to project from a rear face of said adapter body, fitted in said connection recess.

16. A lens-fitted photo film unit as defined in claim 15, further comprising a cutout formed in a peripheral edge of said adapter body, positioned beside said connection projection, and adapted to insertion of a device for removing said connection projection.

17. A lens-fitted photo film unit including a main body pre-loaded with photo film, comprising:
    a taking lens disposed in said main body;
    a front cover for covering a front of said main body, and having a lens opening where said taking lens appears; and an optical adapter, secured to said front cover, and having an auxiliary lens movable to and away from an optical axis of said taking lens, said optical adapter comprising:
- an adapter body secured to said front cover; and
- a lens holder rotatably attached to the adapter body for holding said auxiliary lens, wherein said lens holder is secured to said adapter body movably between a standard photographing position and a specific photographing position, and when set in said standard position, positions said auxiliary lens away from said optical axis, and when set in said specific position, positions said auxiliary lens on said optical axis;
- a positioning hole formed in said front cover; and
- a positioning boss formed to project from a rear face of said adapter body, inserted in said positioning hole for positioning.

* * * * *